United States Patent
Kuppuswamy et al.

(10) Patent No.: US 12,536,039 B2
(45) Date of Patent: Jan. 27, 2026

(54) PERFORMANCE-DRIVEN TIMEOUT

(71) Applicant: Dell Products L.P., Round Rock, TX (US)

(72) Inventors: Sridharan Kuppuswamy, Bangalore (IN); Shantanu Joshi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 497 days.

(21) Appl. No.: 18/296,515

(22) Filed: Apr. 6, 2023

(65) Prior Publication Data
US 2024/0338249 A1    Oct. 10, 2024

(51) Int. Cl.
*G06F 9/46* (2006.01)
*G06F 9/30* (2018.01)
*G06F 9/48* (2006.01)

(52) U.S. Cl.
CPC ........ *G06F 9/4887* (2013.01); *G06F 9/30007* (2013.01)

(58) Field of Classification Search
CPC .................... G06F 9/4887; G06F 9/30007
See application file for complete search history.

*Primary Examiner* — Gregory A Kessler
(74) *Attorney, Agent, or Firm* — Daly, Crowley, Mofford & Durkee, LLP

(57) ABSTRACT

A storage system, comprising: a management system; and a storage processor that is coupled to the management system via a communications network, wherein the storage processor is configured to: receive an instruction to perform an operation; identify a plurality of tasks that are associated with the operation; store, in a database, a respective timeout threshold for each of the plurality of tasks; select one of the plurality of tasks; and update the respective timeout threshold of the selected task based on a utilization of a resource, the respective timeout threshold being updated while the operation is being performed by the storage processor; and wherein the management system is configured to: transmit the instruction to the storage processor; retrieve the respective timeout threshold of the selected task; detect whether the respective timeout threshold of the selected task is expired; when the respective timeout threshold is expired, abort the operation.

20 Claims, 8 Drawing Sheets

| TASK IDENTIFIER | TASK PROGRESS | TIMEOUT THRESHOLD |
|---|---|---|
| TASK_1 412 | 30% COMPLETE 414 | 30 SECONDS 416 |
| TASK_2 412 | 40% COMPLETE 414 | 40 SECONDS 416 |
| TASK_3 412 | 90% COMPLETE 414 | 60 SECONDS 416 |
| OPERATION IDENTIFIER: {<OPERATION ID>,<GUEST OS ID>,<STORAGE PROCESSOR ID>, <TIMESTAMP>} |||

PERFORMANCE-DRIVEN TIMEOUT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a storage system is provided, comprising: a management system; and a storage processor that is coupled to the management system via a communications network, wherein the storage processor is configured to: receive an instruction to perform an operation; identify a plurality of tasks that are associated with the operation; store, in a database, a respective timeout threshold for each of the plurality of tasks; select one of the plurality of tasks; and update the respective timeout threshold of the selected task based on a utilization of a resource, the respective timeout threshold being updated while the operation is being performed by the storage processor; and wherein the management system is configured to: transmit the instruction to the storage processor; retrieve the respective timeout threshold of the selected task; detect whether the respective timeout threshold of the selected task is expired; when the respective timeout threshold is expired, abort the operation; when the respective timeout threshold is not expired, continue to monitor progress of the operation.

According to aspects of the disclosure, a method is provided, comprising: receiving, at a first operating system, an instruction to perform an operation; identifying a plurality of tasks that are associated with the operation; selecting one of the plurality of tasks; and updating a respective timeout threshold of the selected task based on at least one of a utilization rate of a resource that is shared between the first operating system and a second operating system, historical information that is associated with the selected task, and a rate of progress of the selected task, wherein updating the respective timeout threshold includes calculating a new value for the respective timeout threshold and storing the new value in a database that is provided outside of the first operating system, and wherein the updating is performed by a monitoring process that is executed concurrently with one or more other processes that are performing at least one of the plurality of tasks, the monitoring processing being executed inside the first operating system, the one or more other processes being executed inside the first operating system.

According to aspects of the disclosure, a system is provided comprising: a memory; and at least one processor operatively coupled to the memory, the at least one processor being configured to perform the operations of: receiving, at a first operating system, an instruction to perform an operation; identifying a plurality of tasks that are associated with the operation; selecting one of the plurality of tasks; and updating a respective timeout threshold of the selected task based on at least one of a utilization rate of a resource that is shared between the first operating system and a second operating system, historical information that is associated with the selected task, and a rate of progress of the selected task, wherein updating the respective timeout threshold includes calculating a new value for the respective timeout threshold and storing the new value in a database that is provided outside of the first operating system, and wherein the updating is performed by a monitoring process that is executed concurrently with one or more other processes that are performing at least one of the plurality of tasks, the monitoring processing being executed inside the first operating system, the one or more other processes being executed inside the first operating system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
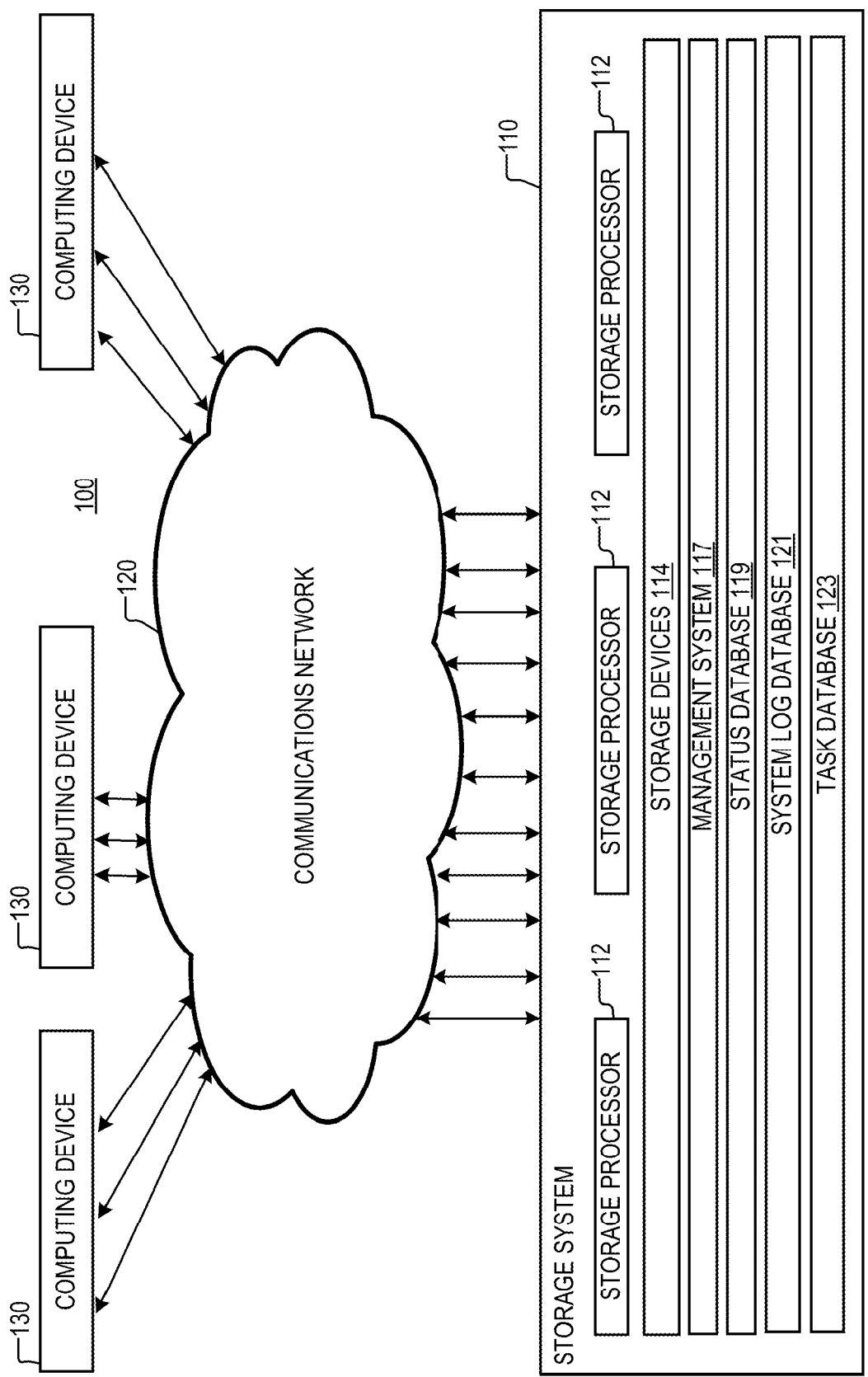
FIG. 1 is a diagram of an example of a system, according to aspects of the disclosure.

In a conventional computing system, when one entity requests a second entity to perform a task, the first entity would normally wait for an acknowledgment that the task is completed. If the acknowledgment is not received within a timeout period, the request may expire and the first entity may generate an error. In conventional systems, the duration of the timeout period is hard-coded in the software that performs the task and is based on a developer's estimate of what constitutes a reasonable time for the task to complete. The assumption behind the timeout period is that if a task takes longer than what is reasonable, the task can safely be assumed to have failed (e.g., due to some internal error, etc.).

In a clustered computing system, what constitutes a reasonable time to complete a task is hard to estimate precicesly. Nodes in a clustered system often share the same resource. This shared resource may be needed to complete the task. To complete the task, a node may need to: (i) gain possession of the shared resource, and (ii) execute the task after possession of the resource is gained. The time needed to gain resource possession is unpredictable. If the clustered computing system is used in a busy environment, the time may be longer than when the clustered computing system is used in a less busy environment. The time spent waiting to gain possession of the resource adds to the overall pendency of the task. The unpredictability of the resource waiting time makes it very difficult to estimate, with reasonable accuracy, how long the task should take to complete. One can ostensibly set the timeout period to a very large value, but this would make the system less efficient, and possibly sluggish. On the other hand, if the timeout period is set too low, this could make the task impossible to complete. In other words, picking an arbitrary value for the timeout period might be suboptimal in applications that involve clustered computing systems.

The present disclosure provides techniques for dynamically setting the timeout periods for different tasks in a clustered computing system. The techniques do away with the need for timeout periods to be hard-coded into the software executing the tasks. The techniques further do away with the requirement for developers to estimate (or guesstimate) the timeout periods during the software development phase. The techniques are advantageous because they adjust the duration of the timeout period of a task based on the deployment context of the clustered computing system, thus making the operation of the clustered computing system more efficient. If the clustered computing system is deployed in a busy environment, the techniques may automatically set the timeout period to a longer duration; if the clustered computing system is deployed in a less busy environment, the techniques may automatically set the timeout period to a shorter duration.

In one example, different guest operating systems may be executed on the same storage processor (e.g., by using a hypervisor). One of the guest operating systems may be asked to complete a task. Inside the guest operating system, a monitoring agent may be executed in parallel with one or more processes that perform the task. The monitoring agent may determine the CPU utilization rate of the storage processor. The CPU is a resource that is shared between the guest operating system and other guest operating systems that are executed on the same storage processor. The monitoring agent may set the timeout threshold for the task to a longer duration if the CPU utilization rate is high (e.g., 95%) and to a lower value if the CPU utilization rate is low (e.g., 20%). This would prevent the task from unnecessarily expiring when the task takes too long to execute due to a heavy system load. At the same time, the approach will prevent the system from taking too long to recognize that the task has failed when the system is under a light load.

A clustered computing system may include a computing device, such as the computing device 700 (shown in FIG. 7), which is configured to execute a plurality of guest operating systems by using a virtualization layer. In such instances, each of the guest operating systems may be considered a different node of the clustered computing system. Alternatively, a clustered computing system may include a plurality of computing devices, such as the computing devices 700 that are coupled to one another via a communications network. In such instances, each of the computing devices may be considered a different node in the computing system. In this regard, the storage array 110 (shown in FIG. 1) may be considered a clustered computing system, and each of the storage processors 112 in the storage array 110 (shown in FIG. 2) may be considered a clustered computing system in its own right, as well.

FIG. 1 is a diagram of an example of a system 100, according to aspects of the disclosure. As illustrated, the system 100 may include a storage array 110, a communications network 120, and a plurality of computing devices 130. The communications network 120 may include one or more of a fibre channel (FC) network, the Internet, a local area network (LAN), a wide area network (WAN), and/or any other suitable type of network. The storage array 110 may include a storage system, such as DELL/EMC Powermax™, DELL PowerStore™, and/or any other suitable type of storage system. The storage array 110 may include a plurality of storage processors 112, a plurality of storage devices 114, a management system 117, a status database 119, a system log database 121, and a task database 123. Each of the storage processors 112 may include a computing device, such as the computing device 700, which is discussed further below with respect to FIG. 7. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRam) device, a non-volatile memory express (NVMe) device, and/or any other suitable type of storage device. The management system 117 may include a computing device, such as the computing device 700, which is discussed further below with respect to FIG. 7. The management system 117 may be used by a system administrator to modify various configuration settings and/or otherwise manage storage array 110. Each computing device 130 may include a laptop computer, a desktop computer, an Internet-of-things (IoT) device, and/or any other suitable type of computing device that might read or write data to the storage array 110. The storage processors 112 may be connected to the management system via one or more of a fibre channel (FC) network, the Internet, a local area network (LAN), a wide area network (WAN), and/or any other suitable type of network.

The status database 119 may include a database for storing information about pending operations that are requested by the management system 117. The status database 119 may be hosted on one or more computing devices, such as the computing device 700 which is discussed further below with respect to FIG. 7. Although the status database 119 is hosted on dedicated computing devices in the example of FIG. 1, alternative implementations are possible in which the status database 119 is hosted on the management system 117 or any other computing device in the storage array 110.

As is discussed further below, the management system 117 may request the performance of operations by the storage processors. Such operations may include performing an upgrade of software that is being executed on a storage processor 112, deploying a guest operating system on the storage processor 112, performing a recovery of a guest operating system, and/or any other suitable type of operations. In some implementations, the operations may not fall in the user I/O (data path), so the instructions are not sent by an external device, such as the devices 130. The operations may be initiated by a system administrator using management software (e.g., Symm Winn that is executing on the management system 117.

Any of the operations that are requested by the management system 117 may involve the completion of one or more tasks. For example, to execute an upgrade operation, a storage processor may perform the following tasks: (i) download an update image, (ii) perform an application failover, and (iii) install the update image. The status of each of these tasks may be registered in the system log database 121, and, in this regard, the system log database 121 may be used to track the progress of operations that are executed by the management system 117.

The system log database 121 may be configured to log events that are generated in the storage processors 112. The event may include "task-started events", "task-completed events", and/or any other suitable type of event. A task-started event may be one that is generated by a storage processor 112 when the storage processor begins performing a task. A task-completed event may be one that is generated by a storage processor 112 when the storage processor completes the task. The system log database 121 may be hosted on one or more computing devices, such as the computing device 700 which is discussed further below with respect to FIG. 7. Although the system log database 121 is hosted on dedicated computing devices in the example of FIG. 1, alternative implementations are possible in which the system log database 121 is hosted on the management system 117 or any other computing device in the storage array 110.

The task database 123 may be a database that identifies a plurality of operations. For each of the operations, the task database 123 may identify one or more tasks that constitute the operation. As is discussed further below, the task database 123 may be used to identify the individual tasks that make a particular operation. The task database 123 may be hosted on one or more computing devices, such as the computing device 700 which is discussed further below with respect to FIG. 7. Although the task database 123 is hosted on dedicated computing devices in the example of FIG. 1, alternative implementations are possible in which the task database 123 is hosted on the management system 117 or any other computing device in the storage array 110.

Figure 2:
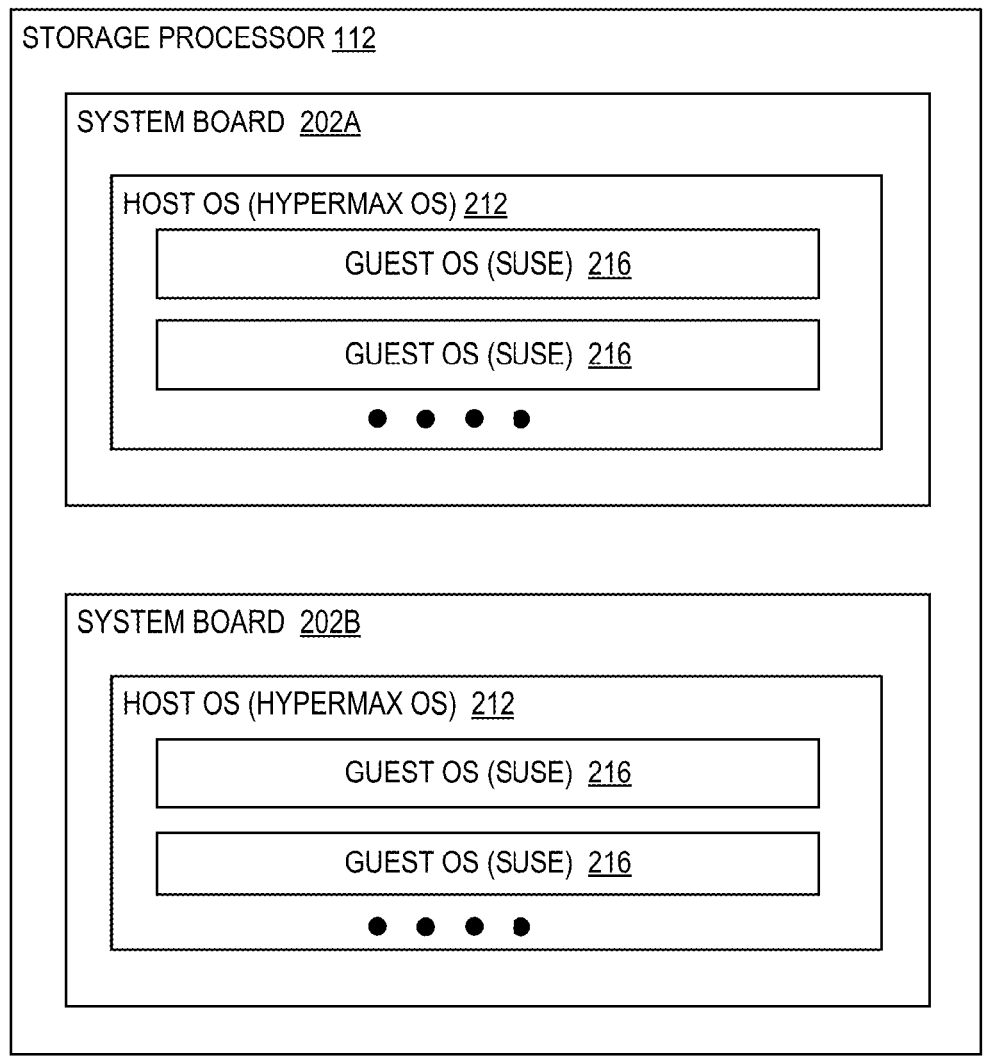
FIG. 2 is a diagram of an example of a storage processor, according to aspects of the disclosure.

FIG. 2 is a diagram of a storage processor 112, according to one possible implementation. In some implementations, each of the storage processors 112 in the storage array 110 may have the configuration that is shown in FIG. 2. As illustrated, the configuration of a storage processor 112, which is shown in FIG. 2 may include system boards 202A and 202B. Each of system boards 202A and 202B may include a motherboard, a processor (e.g., an x86 processor or a MIPS processor, etc.), a memory (e.g., Double Data Random Access Memory (DDRAM), etc.), and/or any other suitable type of component. Each of the system boards 202A and 202B may be configured to execute a respective host operating system (OS). Inside each respective host operating system 212, one or more container threads (not shown) may be executed. Each container thread may spawn a different respective guest operating system instance (i.e., one of the guest operating systems 216) and be responsible for providing virtualized resources to the guest operating system. Each of the container threads may provide various system libraries, binaries, and configuration files that are necessary for the execution of the container thread's respective guest operating system instance. In the present example, each of the guest operating systems 216 is a SUSE Linux™ operating system, however, the present disclosure is not limited to using any specific type of operating system being used.

Figure 3:
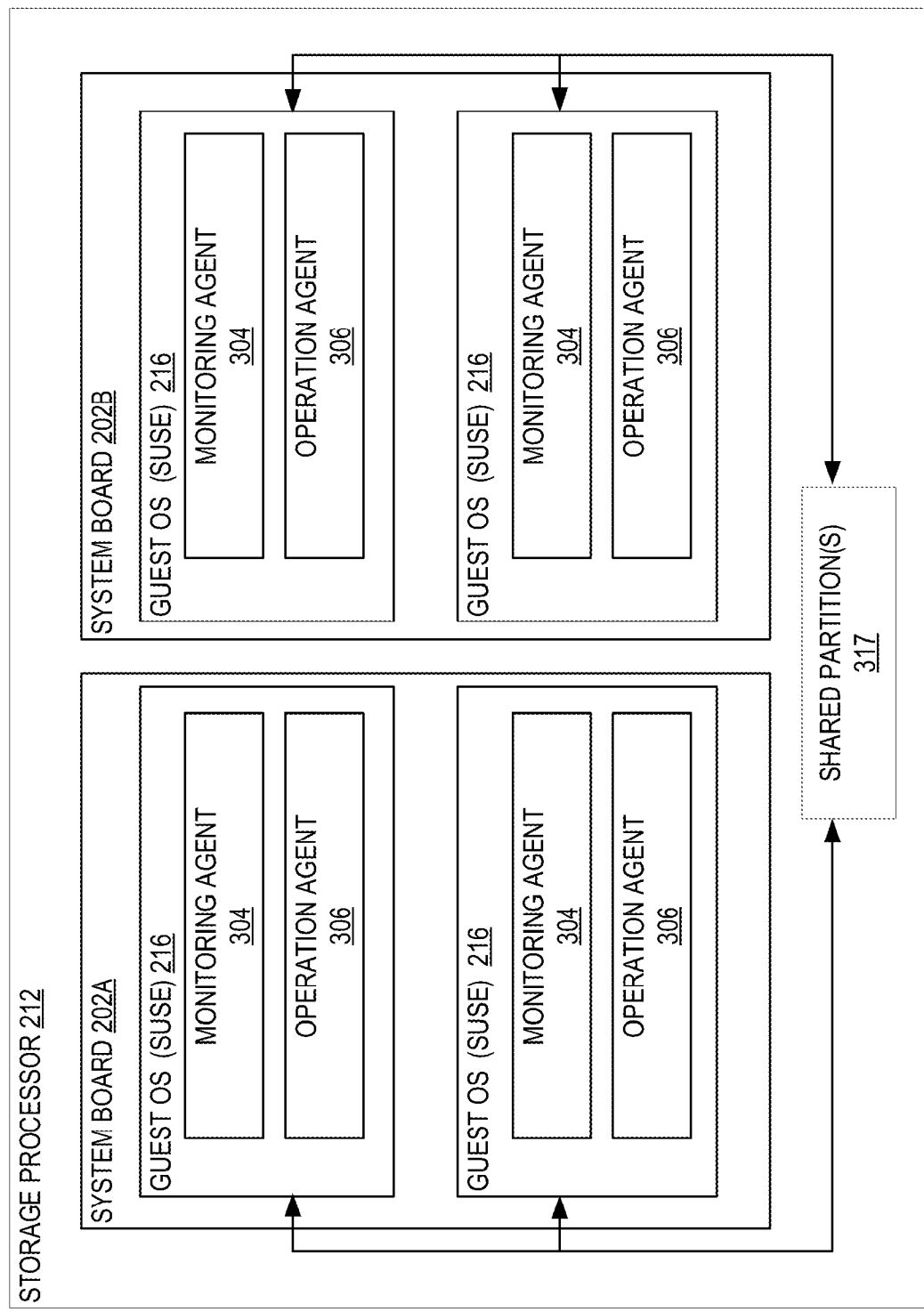
FIG. 3 is a diagram of an example of a storage processor, according to aspects of the disclosure.

FIG. 3 is a diagram of an example of the software environment of a storage processor 112, according to aspects of the disclosure. In the example of FIG. 3, each of the guest operating systems 216 may be configured to access one or more shared storage partitions 317. The shared storage partitions 317 may be implemented on storage devices 114 (shown in FIG. 1). The shared storage partitions 317 may be used internally by the guest operating systems 216 or by applications that are executed in the guest operating systems 216. According to the example of FIG. 3, each of the guest operating systems is configured to execute a respective monitoring agent 304 and a respective operation agent 306. Each operation agent 306 may include one or more processes that are configured to execute an operation that is requested by the management system 117. As noted above, the operation may include an upgrade operation, a deployment operation, a recovery operation, and/or any other suitable type of processing system. Each monitoring agent 304 may include one or more processes that are configured to monitor the performance of an operation by the operation agent 306 that is executed in the same guest operating system 216.

Figures 4, 5:
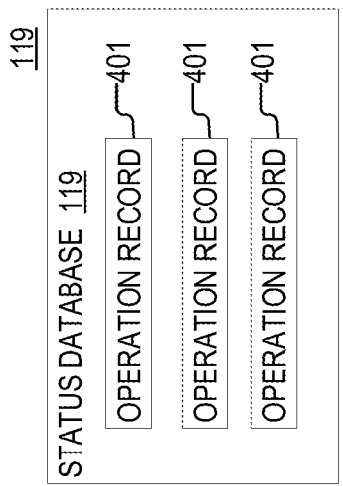
FIG. 4 is a diagram of an example of a status database, according to aspects of the disclosure.
FIG. 5 is a diagram of an operation record, according to aspects of the disclosure.

FIG. 4 is a diagram of the status database 119, according to aspects of the disclosure. The status database 119 may include a plurality of operation records 401. Each of the operation records 401 may correspond to a different operation, which the management system 117 has requested one of the storage processors 112 to perform. In some implementations, at least two of the records 401 may correspond to operations that are performed by different storage processors or different guest operating systems 216 that are executed in the same processor 112.

As is discussed further below, when a storage processor 112 is requested to perform an operation by the management system 117, the storage processor 112 (or the management system 117) may create an operation record 401 in the status database, which is subsequently used to track the progress of the operation. In one respect, each of the operation records 401 may correspond to a different request to perform an operation. For instance, if the management system 117 requests the same operation to be performed by three different guest operating systems 216, each request may have its own operation record 401. In other words, any two operation records 401 in the status database may be associated with different respective requests for the same operation or different respective requests for different operations. The phrases "request to perform an operation" and "instruction to perform an operation" are used interchangeably throughout the disclosure.

FIG. 5 is a diagram of an operation record 401, according to aspects of the disclosure. As illustrated the operation record 401 may include an operation identifier 404. The operation identifier 404 may be any number, string, or alphanumerical string which uniquely identifies the instruction associated with the operation record 401, among a plurality of operations that are requested of different storage processors during a given period of time (e.g., the period starting when the storage array was first deployed and lasting for the entire deployment of the storage array 110, in the past 24 hours, the period starting when the storage array 110 was last restarted and ending at the next restart of the storage array 110, etc.). In the present example, the operation identifier 404 is a 4-tuple, which includes an id of the operation (e.g., an opcode for the operation), and identifier of the guest operating system 216 where the operation is required to be performed, an identifier of the storage processor 112 that is executing the guest operating system 216 where the operation is required to be performed, and a timestamp identifying the exact time when the operation is transmitted.

The operation record 401 may identify a plurality of tasks 412 that make up the operation associated with the operation record 401. As noted above, the execution of a particular operation may require the completion of one or more tasks.

In this regard, the tasks that make up an operation are the tasks that need to be completed in order for the operation to be executed successfully.

The operation record 401 may include a plurality of entries 402. Each entry 402 may correspond to a different one of the tasks that make up the operation that is associated with the operation record 401. Each entry 402 may include: (i) an identifier of the task 412 that is associated with the entry, (ii) a progress indicator 414 for the task, and (iii) a timeout threshold 416 for the task. The progress indicator 414 of a task may identify how far along is an operation agent 306 in completing the task. For example, 0% progress may indicate that the operation 306 has not begun performing the task, 100% progress may indicate that the operation agent 306 has completed the task, and 50% progress may indicate that the task is completed half-way.

The timeout threshold 416 for a task may identify the time when a timeout event would be generated for the task (e.g., by the management system 117). In some implementations, the timeout threshold 416 for a task may specify the time when a timeout period for the task would expire. In such implementations, the value of the timeout threshold may be an exact time, such as 9:05 a.m., for example. Once the time specified by the timeout threshold 416 has passed, the timeout threshold 416 is considered to have expired. On the other hand, if the time specified by the timeout threshold has not passed, the timeout threshold may be considered still active.

In another example, the timeout threshold may specify the duration of a timeout period (e.g., 30 seconds). The timeout period may start when the execution of the task begins. Alternatively, the timeout period may start, when a request to execute an operation that is associated with the task is transmitted by the management system 117. Alternatively, the timeout period may start when the request to execute the task is received by an operation agent 306. The timeout threshold 416 may be considered to be active at any time before the timeout period has expired. The timeout threshold 416 may be considered expired after the duration specified by the timeout threshold 416 has passed following the start of the timeout period. As noted, the end time of the timeout period may be equal to the sum of the start time of the timeout period and the duration that is specified by the timeout threshold 416 for the task.

The timeout threshold 416 for a task may be utilized by the management system 117 that requested the execution of an operation that includes a task. When the timeout threshold 416 for the task expires, a timeout event may be generated by the management system 117. In response to the timeout event, the management system 117 may take any suitable action, such as generating an error message or re-submitting a request to perform the operation including the task.

Figure 6A:
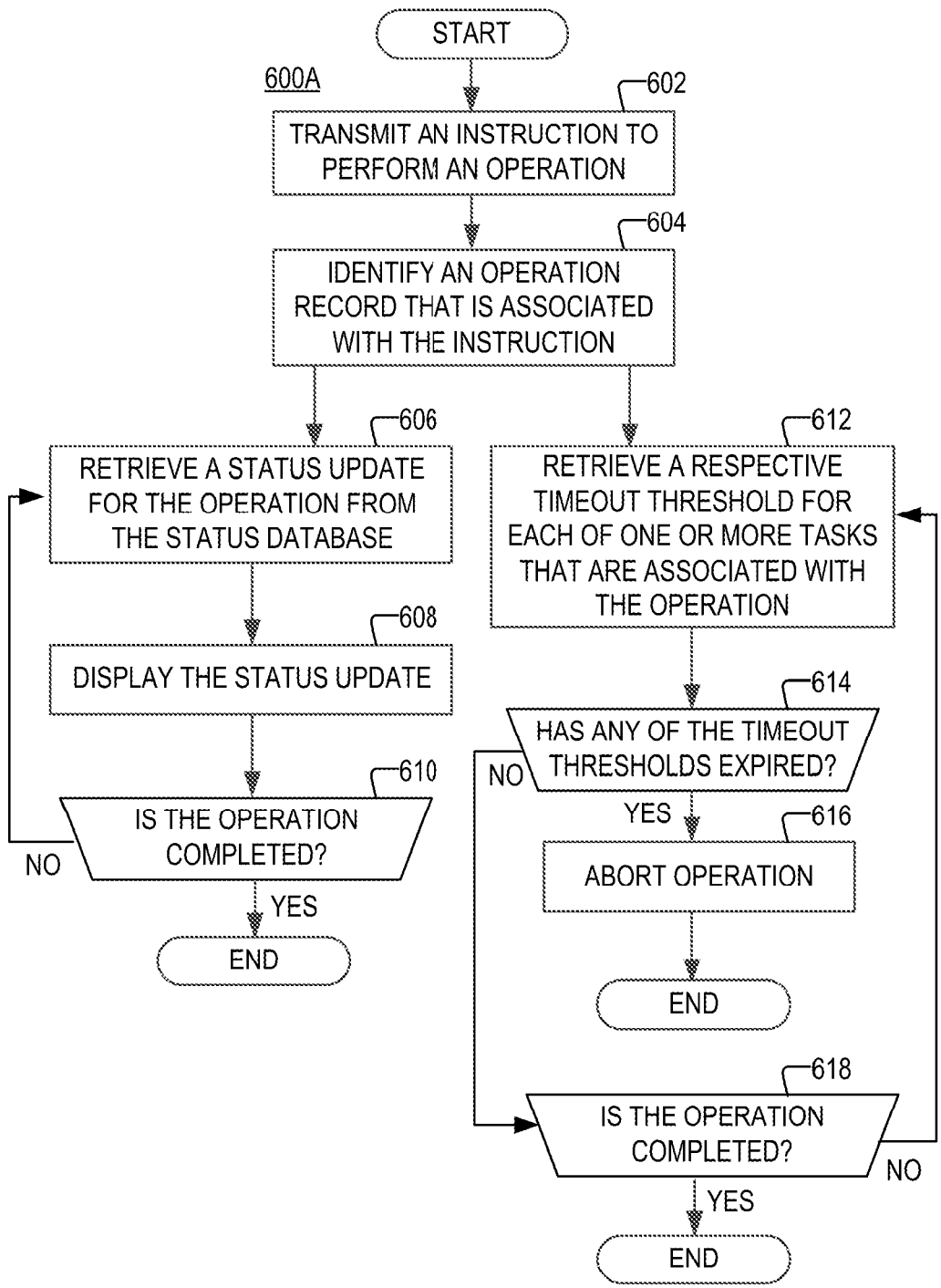
FIG. 6A is a flowchart of an example of a process, according to aspects of the disclosure.

FIG. 6A is a flowchart of an example of a process 600A, according to aspects of the disclosure.

At step 602, the management system 117 transmits an instruction to perform an operation. The operation may include an update operation, a deployment operation, a recovery operation, and/or any other suitable type of operation. According to the present example, the instructions is transmitted to the operation agent 306 that is executing in one of the guest operating systems 216 on any of the storage processors 112 of the storage array 110. However, the present disclosure is not limited to the instruction being transmitted to any specific entity.

At step 604, the management system 117 identifies the operation record 401 that corresponds to the instruction (transmitted at step 602). In one example, identifying the operation record 401 may include generating locally an identifier for the operation record by using the convention described above with respect to operation identifier 404 of FIG. 5. In another example, the management system 117 may receive the identifier for the operation record 401 from the entity that created operation record (e.g., the monitoring agent 304 or the operation agent 306 that executes step 626 of the process 600B). The operation record identified at step 604 of process 600A may be the same as the operation record 401 that is created at step 626 of the process 626B.

At step 606, the management system 117 retrieves a status update for the operation from the status database 119. Retrieving the status update for the operation may include: (i) using the operation record identifier (obtained at step 604) to retrieve, from the status database 119, the operation record 401 that corresponds to the instruction (transmitted at step 602), and (ii) retrieving, from the operation record 401, the respective progress indicator 414 of each of one or more tasks that make up the operation.

At step 608, the status update is displayed. Displaying the status update may include one or more of: displaying the respective progress indicator 414 for each of the tasks that make up the operation, displaying identifiers of one or more the tasks that make up the operation that have been completed already along with an indication that they have been completed, and/or displaying identifiers of one or more of the tasks that make up the operation which have not yet begun executing along with an indication that they have not commenced yet. In some implementations, displaying the status update may include rendering the status update on a display device or transmitting the status update over a communications network for presentation on a remote device.

At step 610, the management system 117 determines whether the operation is completed. If the operation is not completed, steps 606-610 are repeated. Otherwise, if the operation is completed, steps 606-610 are repeated no more, and the execution is stopped of the branch of process 600A that includes steps 606-610.

At step 612, the management system 117 retrieves the respective timeout threshold 416 for each (or at least some) of the tasks that make up the operation (requested at step 602). Retrieving the timeout thresholds 416 may include: (i) using the operation record identifier (obtained at step 604) to retrieve, from the status database 119, the operation record 401 that corresponds to the instruction (transmitted at step 602), and (ii) retrieving, from the operation record 401, the respective timeout threshold 416 of each (or at least some) of the tasks that make up the operation.

At step 614, the management system 117 determines if any of the timeout thresholds (retrieved at step 606) has expired. If at least one of the timeout thresholds has expired, the process 600A proceeds to step 616. Otherwise, if none of the retrieved timeout thresholds has expired, the process 600A proceeds to step 618.

At step 616 the operation (transmitted at step 602) is aborted. In some implementations, aborting the operation may include one or more of stopping the execution of process 600A, re-transmitting the request to perform the operation (e.g., attempting a new execution of the same operation), stopping to monitor the progress of the operation, generating an error message, transmitting a follow-up instruction to the same entity that received the instruction, which instructs the entity to revert to the state it was in before receiving the instruction, and/or any other suitable action. In a preferred embodiment, when the timeout threshold for a task is expired, the task may be retried a predetermined number of times before the operation is expired. In some implementations, the term "abort an operation" may mean "stopping a current effort associated with the operation" and optionally "making a new effort that is associated with the operation".

At step 618, the management system 117 determines whether the operation (requested at step 602) is completed. If the operation is not completed, steps 612-616 are repeated. Otherwise, if the operation is completed, steps 612-616 are repeated no more, and the execution is stopped of the branch of process 600A that includes steps 612-618.

Figure 6B:
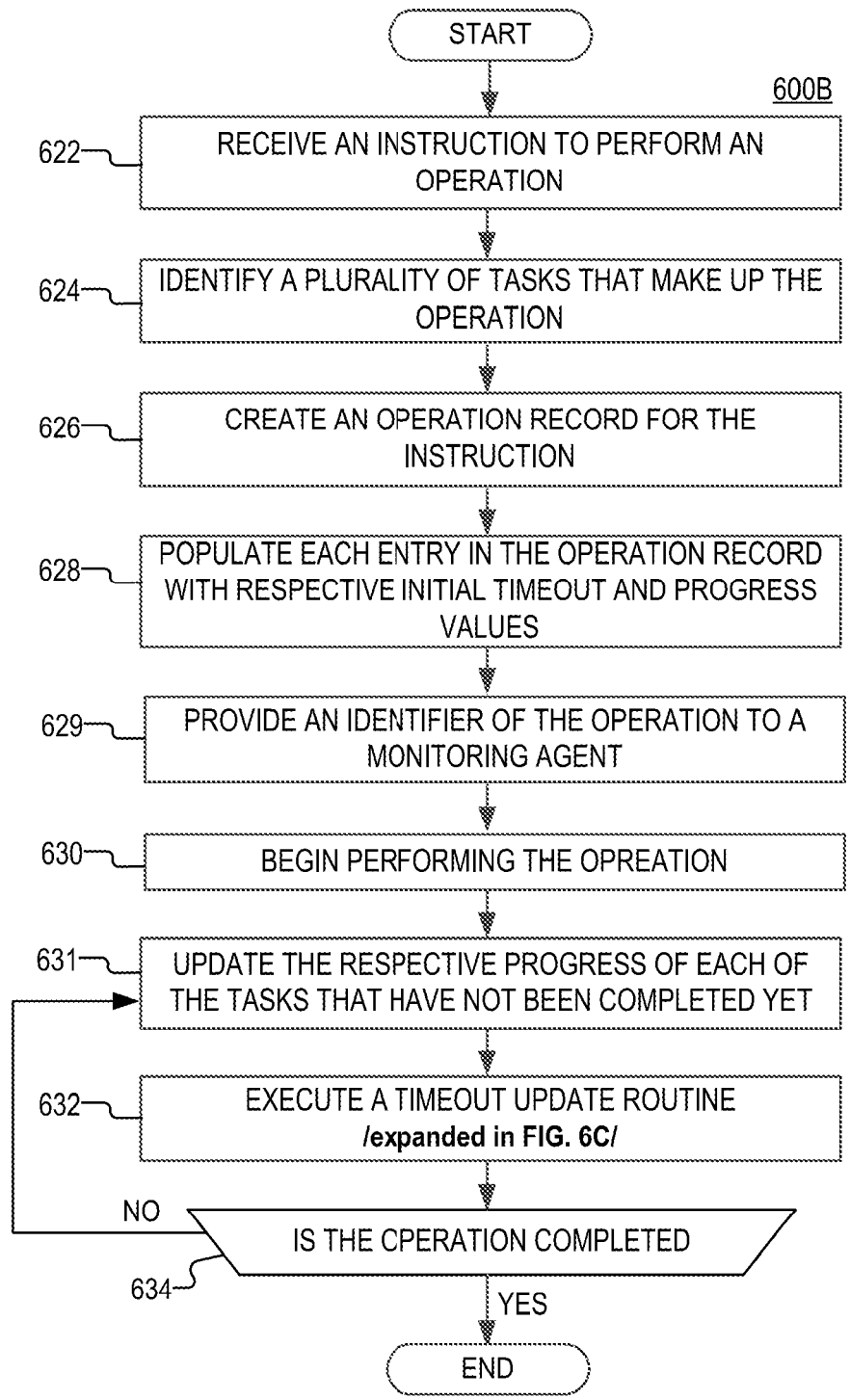
FIG. 6B is a flowchart of an example of a process, according to aspects of the disclosure.

FIG. 6B is a flowchart of an example of a process 600B, according to aspects of the disclosure.

At step 622, an operation agent 306 receives an instruction to perform an operation. The instruction may be the same or similar to the instruction transmitted at step 602 of process 600A. The instruction may be received from the management system 117 and/or any other entity.

At step 624, the operation agent 306 identifies a plurality of tasks that make up the operation. In some implementations, the plurality of tasks may be identified by using the task database 123.

At step 626, the operation agent 306 generates an operation record 401 that corresponds to the instruction (received at step 622). The operation record may include a plurality of entries 402. Each entry 402 may correspond to a different one of the tasks (identified at step 624). The operation record 401 is stored in the status database 119.

At step 628, the operation agent 306 populates each of the entries 402, in the operation record 401 (generated at step 626), with an initial (or default) value for the timeout threshold 416 of the entry's 402 corresponding task. Furthermore, at step 628, each of the entries is populated with an initial progress indicator 414 for the entry's corresponding task's progress (e.g., 0%).

At step 629, the operation agent 306 provides an identifier of the operation record (created at step 626) to a monitoring agent 304. According to the present example, the monitoring agent 304 is executed in the same guest operating system 216 as the operation agent 306. However alternative implementations are possible in which the monitoring agent 304 and the operation agent 306 are executed in different guest operating systems 216 or by different storage processors 112.

At step 630, the operation agent 306 begins executing the operation. As noted above, executing the operation may include executing each of the tasks that make up the operation. For each of the tasks, the operation agent may generate log entries that identify the status of the task. The log entries may be stored in the system log database 121. Each log entry may include: (i) an identifier of the task associated with the entry, (ii) an identifier of the operation or an identifier of the request (received at step 622), (iii) and status information corresponding to the task that is associated with the information. By way of example, the status information may include an indication of the progress that is made towards completing the task and/or whether execution of the task has commenced.

At step 631, the monitoring agent 304 updates the respective progress of each of the tasks (identified at step 624). To update the progress for each of the tasks, the monitoring agent 304 may first retrieve the operation record 401 (created at step 626). Next, the monitoring agent 304 may identify, in the retrieved operation record 401, the respective entry 402 for each of the tasks (identified at step 624) which are not completed yet. Next, for each of the identified entries 402, the monitoring agent 304 may: (i) identify the task corresponding to the entry, (ii) perform a search of the system log database 121 for log entries that correspond to the task (e.g., perform a search for entries stored in the system log database 121 since the last execution of step 631), and (iii) detect, based on the entries, whether the progress of the task has increased, and (iv) if a determination is made that the task has progressed, insert, in the entry 402, a new value for the progress indicator 414, and (v) if a determination is made that the task has not progressed, leave unchanged the progress indicator 414 that is currently in the entry 402. For example, if the current progress indicator 414 for a task is 20%, while the system log database 121 indicates that the task has become 50% complete, the monitoring agent 304 may overwrite the value of "20%" with "50%" in the entry 402 that corresponds to the task.

At step 632, the monitoring agent 304 executes a timeout update routine. In some implementations, the timeout update routine may be executed in accordance with a process 600C, which is discussed further below with respect to FIG. 6C.

At step 630, the monitoring agent 304 determines if the operation (requested at step 622) is completed (e.g., by examining the system log database 121). If the operation is completed, the process 600B ends. Otherwise, the process 600B returns to step 631, and steps 631-634 are repeated again.

Figure 6C:
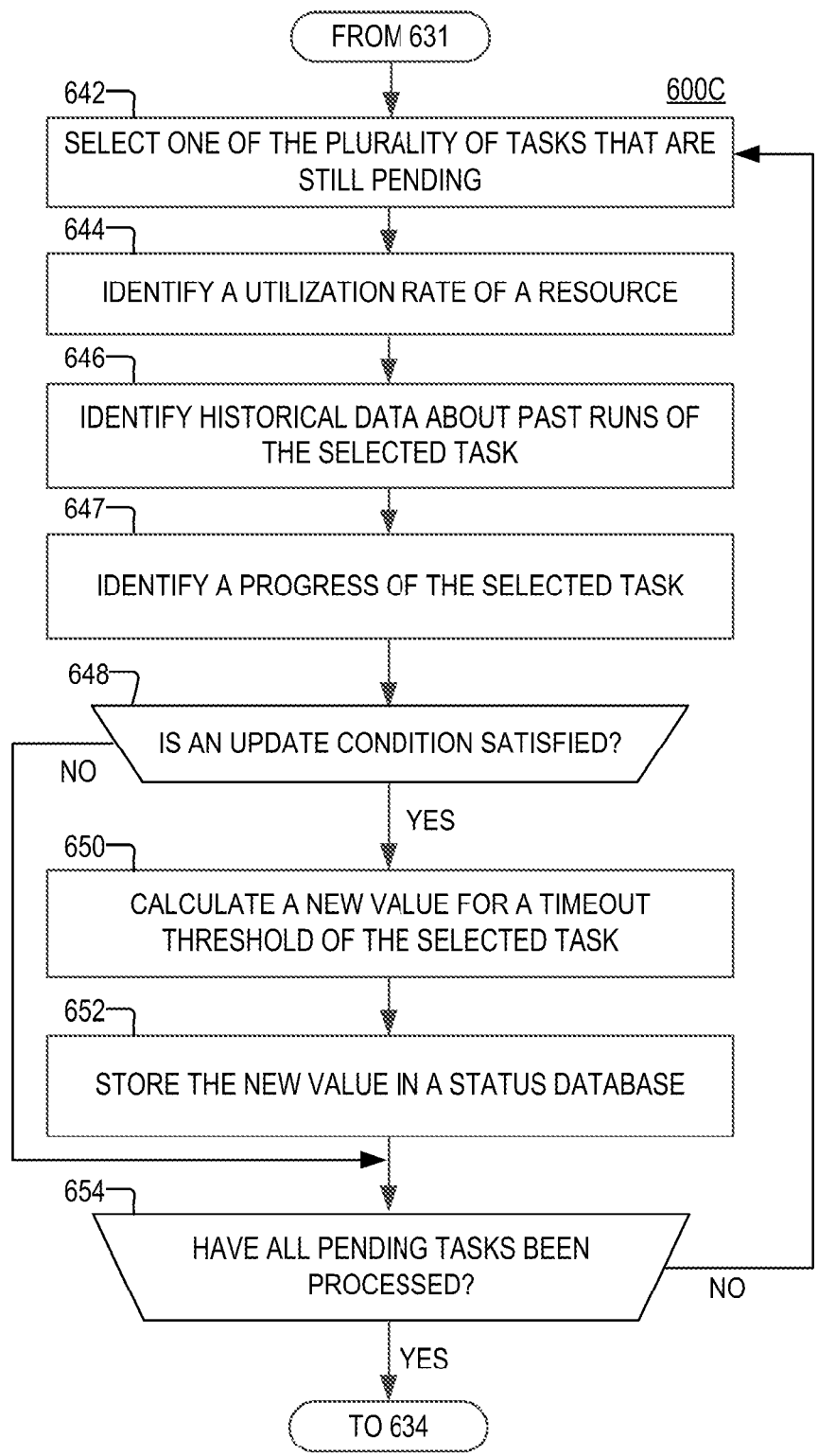
FIG. 6C is a flowchart of an example of a process, according to aspects of the disclosure.

FIG. 6C is a flowchart of an example of a process 600C for executing a timeout update routine, as specified by step 632 of the process 600B, according to aspects of the disclosure.

At step 642, one of the plurality of tasks (identified at step 632) that are still pending is selected. In some implementations, selecting the task may include retrieving from the status database 119 the operation record 401 (created at step 626) and retrieving, from the operation record 401, the entry 402 that corresponds to the task.

At step 644, the monitoring agent 304 identifies a utilization rate of a resource. In one example, the resource may be a resource that is shared between a first guest operating system 216 and one or more second guest operating systems 216. The first guest operating system 216 and the second guest operating systems 216 may be executed on the same storage processor 112 (and/or on the same system board 202). The first guest operating system 216 may be a guest operating system inside which the monitoring agent 304 and the operation agent 306 (which perform processes 600B-C) are executed. In some implementations, the shared resource may include CPU, memory, communications interface, a storage device, etc. The utilization rate may include a CPU utilization rate, a memory utilization rate, an amount of data that is transmitted or received over a communications interface, and/or an amount of data that is read or written to a storage device.

At step 646, the monitoring agent 304 identifies historical data about past executions of the task (selected at step 642). The historical data may be retrieved from the system log database 121. The historical data may correspond to a period immediately preceding the execution of step 646 (e.g., the past 1 hour, the past 24 hours, etc.). The historical data may include one or more of the average time the task has taken to execute in the period, the longest time the task has taken to execute in the period, or the shortest time the task has taken to execute in the period.

At step 647, the monitoring agent 304 identifies the progress of the selected task. In one example identifying the progress may include retrieving the progress indicator 414 from the entry 402 (identified at step 642). Additionally or alternatively, identifying the progress may include identifying the rate (per unit time) at which the progress indicator 414 in the entry 402 (identified at step 642) changes.

At step 648, the monitoring agent 304 determines if an update condition is satisfied. The update condition may be based on one or more of: (i) the information obtained at step 644, (ii) the information obtained at step 646, and (iii) the information obtained at step 647. The present disclosure is not limited to any specific condition being used. In one example, the condition may be satisfied if the resource utilization rate (determined at step 644) has exceeded (or fallen below) a predetermined threshold. In another example, the condition may be satisfied if the resource utilization rate (determined at step 644) has increased (or decreased) by at least a predetermined amount since the last time step 644 was executed. In another example, the condition may be satisfied, if the rate at which the task (selected at step 642) progresses has increased (or decreased) by at least a predetermined amount since the last time the progress rate was measured. The progress rate of a task may show how fast the completion of the task advances and it may be measured in percent per unit time. For example, a progress rate of 2%/second may indicate that 2% of the task is completed every second (which implies that the task would be completed in 50 seconds if the rate holds). In another example, the condition may be satisfied if the difference between the value of the timeout threshold 416 for the task (selected at step 642) and the average time for performing the task (determined at step 646) is less than a predetermined threshold. For example, the condition may be satisfied if the timeout threshold (or timeout period defined by the timeout threshold) is too close to the average time to complete the task, etc. If the condition is satisfied, the process 600C proceeds to step 650. Otherwise, if the condition is not satisfied, the process 600C proceeds to step 654.

At step 650, the monitoring agent 304 calculates a new value of the timeout threshold 416 of the task (selected at step 642) is calculated. The new value may be determined based on one or more of: (i) the information obtained at step 644, (ii) the information obtained at step 646, and (iii) the information obtained at step 647. The present disclosure is not limited to any specific model for calculating the new value. In one example, the initial timeout threshold value (populated at step 628) may assume a resource utilization rate U1 (e.g., 25% utilization rate). The current utilization rate of the same resource, as determined at step 644, may be U2 (e.g., 71% utilization rate). In such implementations, the new value may be equal to the product of the initial timeout value and the ratio of U2 and U1 (i.e., new_tiemout_threshold_value=initial_timeout_threshold_value* (U2/U1)). In one example, the initial timeout threshold value (populated at step 628) may assume a progress rate R1 (2% per second). The current progress rate of the task, as determined at step 647, may be R2 (e.g., 1.5% per second). In such implementations, the new value may be equal to the product of the initial timeout value and the ratio of R2 and R1 (i.e., new_timeout_threshold_value=initial_timeout_threshold_value* (R2/R1)). In another example, the new value for the timeout threshold 416 may be determined by searching a data structure (not shown) based on one or more of the quantities determined at steps 644, 646, and 647. As a result of the search, the new value of the timeout threshold may be retrieved. The data structure may be stored in the memory of the storage processor executing the monitoring agent 304 or at another location. The data structure may map different values for any of the quantities determined at steps 644, 646, and 647 (or different combinations of quantities values) to a corresponding timeout threshold values. In one example, the data structure may be a tabular representation of the function F (D1, D2, D3), where F is the timeout threshold, D1 is a data item obtained at step 644, D2 is a data item obtained at step 646, and D3 is a data item obtained at step 647. In another example, the data structure may be a tabular representation of the function F (D1, D2), where F is the timeout threshold, D1 is a data item obtained at one of steps 644-647 and D1 is a data item obtained at another one of steps 644-647. In yet another example, the data structure may be a tabular representation of the function F (D1), where F is the timeout threshold and D1 is a data item obtained at one of steps 644-647. The data structure may be populated by a system administrator or a software developer.

At step 652, the new timeout threshold value (determined at step 650) is stored in the status database 119. Storing the new value in the status database 119 may include overwriting an existing value for the timeout threshold 416 in the entry 402 (retrieved at step 642) with the new value (calculated at step 650). Step 652 results in the timeout threshold for the task (selected at step 642) being updated. The updated timeout threshold may be retrieved by the management system 117 (at step 612 of process 600A) and used accordingly.

At step 654, a determination is made if all of the tasks (identified at step 624) which have not completed yet, have been processed. If all pending tasks have been completed, the process 600C returns to step 634. Otherwise, the process 600C returns to step 642, and another one of the tasks is selected, which has not been selected during an earlier iteration of steps 642-654.

FIGS. 6A-C are provided as an example only. At least some of the steps in each of processes 600A-C may be performed in parallel, performed in a different order, or altogether omitted. For instance one or two of steps 644, 646, and 647 may be omitted. Although in the example of FIG. 6A, the process 600A is performed by the management system 117 (or a management application that is executed on the management system 117), the present disclosure is not limited to any specific entity executing the process 700. In the example of FIGS. 6B-C, the processes 600A-C are executed by a monitoring agent and an operation agent that are executed in the same guest operating system instance. However, the present disclosure is not limited to any specific entity executing any one of the steps in processes 600B-C. For example, in some implementations, the monitoring agent (rather than the operation agent) can perform steps 624-628 of process 600B. The term "monitoring agent" refers to software and/or hardware (or process or threads) that performs an operation. Each operation that a storage processor may be performed by a different storage agent. A storage agent may be integrated in a larger body of software and is not necessarily a standalone unit.

Processes 600A-C may be performed in parallel in each other. Processes 600A-C may be executed when the management system 117 requests an operation to be executed by one of the storage processors 112. While the operation is pending (i.e. before the operation is completed), the management system 117 may perform the following actions: (i) retrieve one or more times the timeout thresholds for tasks that constitute the operation, (ii) detect if any of the timeout thresholds has expired, (iii) abort the operation if any of the timeout thresholds has expired, and (iv) do nothing if none of the timeout thresholds has expired. While the operation is being executed by an operation agent, a monitoring agent may be executed concurrently with the operation agent.

While the operation is pending (i.e., before the operation is completed), the monitoring agent may periodically update the timeout thresholds for the tasks that are stored in the status database.

Figure 7:
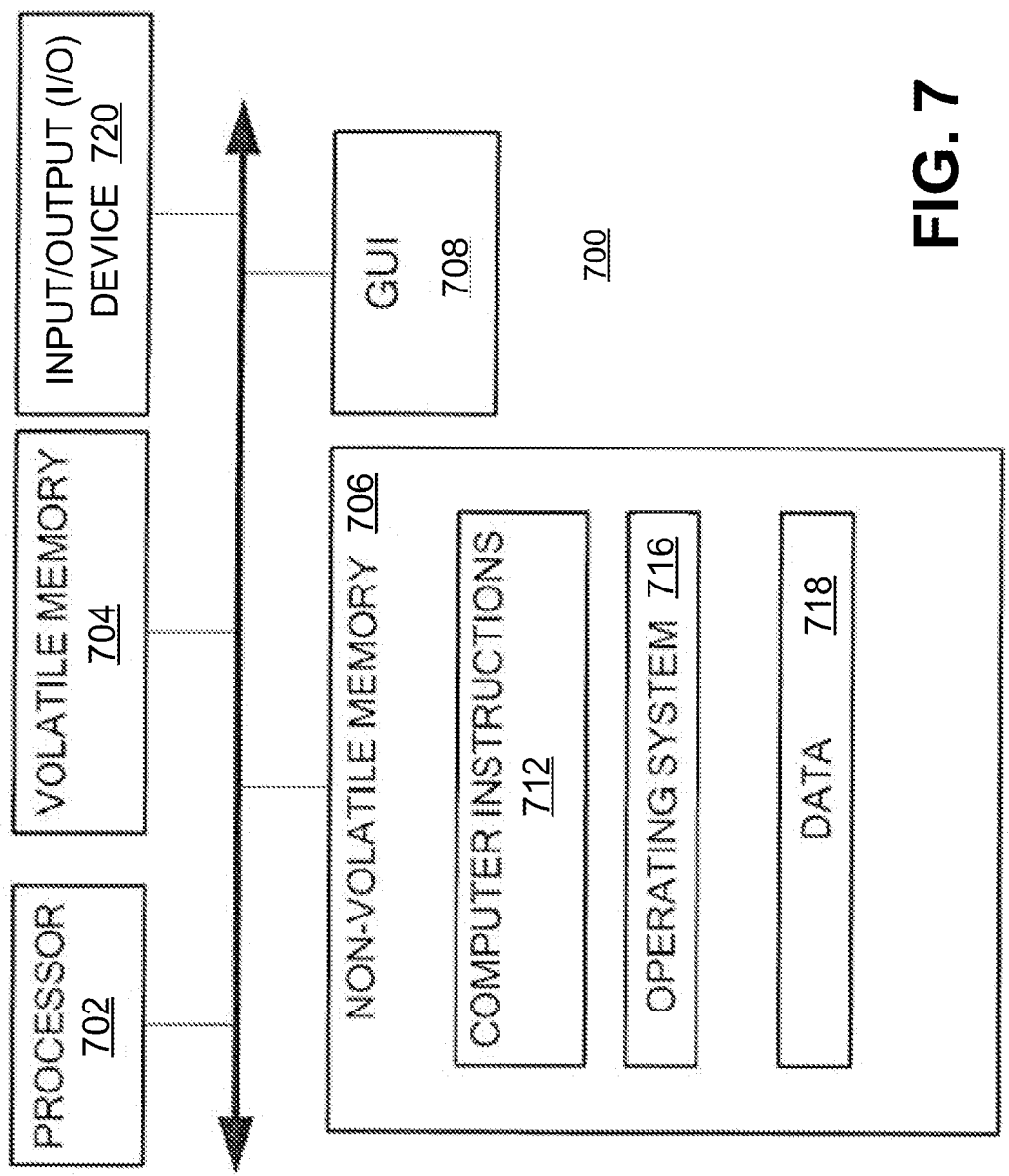
FIG. 7 is a diagram of an example of a computing device, according to aspects of the disclosure.

Referring to FIG. 7, in some embodiments, a computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (⅟₂₃)

It will be further understood that various changes in the details, materials, and arrangements of the parts which have been described and illustrated in order to explain the nature of the claimed invention might be made by those skilled in the art without departing from the scope of the following claims.

The invention claimed is:

1. A storage system, comprising:
a management system; and
a storage processor that is coupled to the management system via a communications network,
wherein the storage processor is configured to: receive an instruction to perform an operation; identify a plurality of tasks that are associated with the operation; store, in a database, a respective timeout threshold for each of the plurality of tasks; select one of the plurality of tasks; and update the respective timeout threshold of the selected task based on a utilization of a resource, the respective timeout threshold being updated while the operation is being performed by the storage processor; and
wherein the management system is configured to: transmit the instruction to the storage processor; retrieve the respective timeout threshold of the selected task; detect whether the respective timeout threshold of the selected task is expired; when the respective timeout threshold is expired, abort the operation; when the respective timeout threshold is not expired, continue to monitor progress of the operation.

2. The storage system of claim 1, wherein the instruction to perform the operation includes an instruction to perform a system update, and the plurality of tasks includes: (i) an update image download, (ii) an application failover, and (iii) an installation of the update image.

3. The storage system of claim 1, wherein the database is stored on a computing device other than the management system and the storage processor, and retrieving the respective timeout threshold of the selected task includes transmitting to the database a request for the respective timeout threshold, the request being transmitted over the communications network, and receiving the respective timeout threshold in response to the request.

4. The storage system of claim 1, wherein the storage processor is further configured to detect whether a condition for updating the respective timeout threshold of the selected task is satisfied, and the respective timeout threshold of the selected task is updated if and only if the condition is satisfied.

5. The storage system of claim 1, wherein the respective timeout threshold of the selected task is performed further based on historical information that indicates how long it has taken the selected task to complete in the past.

6. The storage system of claim 1, wherein the database is stored on a computing device other than the management system and the storage processor.

7. The storage system of claim 1, wherein:
the storage processor is further configured to create a database record that is associated with the instruction, the database record including a plurality of entries, each entry corresponding to a different one of the plurality of tasks, and
updating the respective timeout threshold of the selected task includes calculating a new value for the respective timeout threshold, identifying one of the plurality of entries that corresponds to the selected task, and overwriting a current value of the respective timeout threshold that is stored in the identified entry with the new value of the respective timeout threshold.

8. A method, comprising:
receiving, at a first operating system, an instruction to perform an operation;
identifying a plurality of tasks that are associated with the operation;
selecting one of the plurality of tasks; and
updating a respective timeout threshold of the selected task based on at least one of a utilization rate of a resource that is shared between the first operating system and a second operating system, historical information that is associated with the selected task, and a rate of progress of the selected task,
wherein updating the respective timeout threshold includes calculating a new value for the respective timeout threshold and storing the new value in a database that is provided outside of the first operating system, and
wherein the updating is performed by a monitoring process that is executed concurrently with one or more other processes that are performing at least one of the plurality of tasks, the monitoring processing being executed inside the first operating system, the one or more other processes being executed inside the first operating system.

9. The method of claim 8, further comprising:
transmitting the instruction from a management utility to the first operating system;
retrieving, by the management utility, the respective timeout threshold of the selected task, the respective timeout threshold being retrieved from the database;
detecting whether the respective timeout threshold of the selected task is expired;
when the respective timeout threshold is expired, aborting the operation;
when the respective timeout threshold is not expired, continuing to monitor progress of the operation.

10. The method of claim 8, wherein the updating is performed based on the utilization rate of the resource.

11. The method of claim 8, wherein the historical information indicates how long it has taken the selected task to complete in the past, and the updating is performed based on the historical information.

12. The method of claim 8, wherein the updating is performed based on the rate of progress of the selected task.

13. The method of claim 8, wherein the first operating system and the second operating system are executed on a same storage processor or on different storage processors.

14. The method of claim 8, wherein the instruction to perform the operation includes an instruction to perform a system update, and the plurality of tasks includes: (i) an update image download, (ii) an application failover, and (iii) an installation of the update image.

15. The method of claim 8, further comprising detecting whether a condition for updating the respective timeout threshold of the selected task is satisfied, wherein the respective timeout threshold of the selected task is updated if and only if the condition is satisfied.

16. A system comprising:
a memory; and at least one processor operatively coupled to the memory, the at least one processor being configured to perform the operations of:

receiving, at a first operating system, an instruction to perform an operation;

identifying a plurality of tasks that are associated with the operation;

selecting one of the plurality of tasks; and updating a respective timeout threshold of the selected task based on at least one of a utilization rate of a resource that is shared between the first operating system and a second operating system, historical information that is associated with the selected task, and a rate of progress of the selected task, wherein updating the respective timeout threshold includes calculating a new value for the respective timeout threshold and storing the new value in a database that is provided outside of the first operating system, and wherein the updating is performed by a monitoring process that is executed concurrently with one or more other processes that are performing at least one of the plurality of tasks, the monitoring processing being executed inside the first operating system, the one or more other processes being executed inside the first operating system.

17. The system of claim 16, wherein the at least one processor is further configured to perform the operations of:

transmitting the instruction from a management utility to the first operating system;

retrieving, by the management utility, the respective timeout threshold of the selected task, the respective timeout threshold being retrieved from the database;

detecting whether the respective timeout threshold of the selected task is expired;

when the respective timeout threshold is expired, aborting the operation;

when the respective timeout threshold is not expired, continuing to monitor progress of the operation.

18. The system of claim 16, wherein the updating is performed based on the utilization rate of the resource.

19. The system of claim 16, wherein the historical information indicates how long it has taken the selected task to complete in the past, and the updating is performed based on the historical information.

20. The system of claim 16, wherein the updating is performed based on the rate of progress of the selected task.

* * * * *